(12) United States Patent
Yang

(10) Patent No.: US 7,864,417 B2
(45) Date of Patent: Jan. 4, 2011

(54) TELESCOPE HAVING A FOCUS DISPLAY

(76) Inventor: William Yang, 28F, No. 29-5, Sec. 2, Jhongjheng E. Rd., Danshuei Township, Taipei County (TW)

( * ) Notice: Subject to any disclaimer, the term of this patent is extended or adjusted under 35 U.S.C. 154(b) by 368 days.

(21) Appl. No.: 12/216,861

(22) Filed: Jul. 11, 2008

(65) Prior Publication Data
US 2010/0007948 A1    Jan. 14, 2010

(51) Int. Cl.
*G02B 23/00*    (2006.01)
(52) U.S. Cl. ................. 359/425; 359/506; 250/559.29; 356/614
(58) Field of Classification Search ........................ None
See application file for complete search history.

*Primary Examiner*—Stephone B Allen
*Assistant Examiner*—Derek S Chapel
(74) *Attorney, Agent, or Firm*—Rosenberg, Klein & Lee

(57) ABSTRACT

A telescope having a focus display includes a tube assembly, a sensor and a focus display. The tube assembly has a first tube and a second tube connected within the first tube. The first tube has an opening. The sensor is provided on the second tube. The focus display is provided in the opening of the first tube. The focus display is provided with a screen, a processing unit and an electromagnetic sensing unit. The electromagnetic sensing unit, the processing unit and the screen are electrically connected with each other. When the first tube is telescopically moved with respect to the second tube, the electromagnetic sensing unit receives and senses the change in the electromagnetic field of the sensor. The processing unit then calculates the displacement and displays the data on the screen, so that the user can focus the telescope to obtain the clearest image.

9 Claims, 4 Drawing Sheets

TELESCOPE HAVING A FOCUS DISPLAY

BACKGROUND OF THE INVENTION

1. Field of the Invention

The present invention relates to a telescope having a focus display, and in particular to a telescope having the capability of displaying focus data.

2. Description of Related Art

A telescope utilizes optical lenses to magnify an image, so that a user can observe a magnified image. The telescope is applicable to various fields, such as military detection, star and bird observation or the like.

In general, a telescope is provided in its tubes with a plurality of optical lenses. Via the relative displacement of these tubes, the focus between these optical lenses can be adjusted, thereby obtaining the optimal magnification and the clearest image.

A common telescope is provided with a scale, whereby the user can recognize the graduations on the scale when the tubes are extended or retracted, thereby adjusting the distance between the optical lenses to obtain the optimal image.

However, the graduations of a mechanical scale may be worn after being used for a long time, so that it is difficult for the user to recognize. Furthermore, the precision of the mechanical scale is poor, so that the user cannot be provided with the most precise data. As a result, the user has to adjust the focus several times to obtain the clearest image when using the telescope.

Consequently, because of the above limitation resulting from the technical design of prior art, the inventor strives via real world experience and academic research to develop the present invention, which can effectively improve the limitations described above.

SUMMARY OF THE INVENTION

The object of the present invention is to provide a telescope having a focus display, in which an electronic focus display is provided. Via this arrangement, the user can be provided with clear focus data very easily with higher precision. Thus, the user can focus the telescope to obtain the optimal focus quickly, thereby obtaining the clearest image.

In order to achieve the above objects, the present invention provides a telescope having a focus display, which includes a tube assembly having a first tube and a second tube connected within the first tube, the first tube having an opening; a sensor provided on the second tube; and a focus display provided in the opening of the first tube, the focus display being provided with a screen, a processing unit and an electromagnetic sensing unit; the screen, the processing unit and the electromagnetic sensing unit being electrically connected with each other. When the first tube is telescopically moved with respect to the second tube, the electromagnetic sensing unit receives and senses the change in the electromagnetic field of the sensor. The processing unit calculates the displacement and represents the data on the screen.

The present invention has advantageous features as follows. When the first tube is telescopically moved with respect to the second tube, the electromagnetic sensing unit of the focus display and the sensor are used to calculate the precise displacement and display the focus data on the screen, so that the user can recognize a clear focus data easily. Therefore, the user can focus the telescope to obtain the optimal focus quickly, thereby obtaining a clear image.

In order to further understand the characteristics and technical contents of the present invention, a detailed description relating thereto will be made with reference to the accompanying drawings. However, the drawings are illustrative only, but not used to limit the scope of the present invention.

DETAILED DESCRIPTION OF THE PREFERRED EMBODIMENTS

Figure 1:
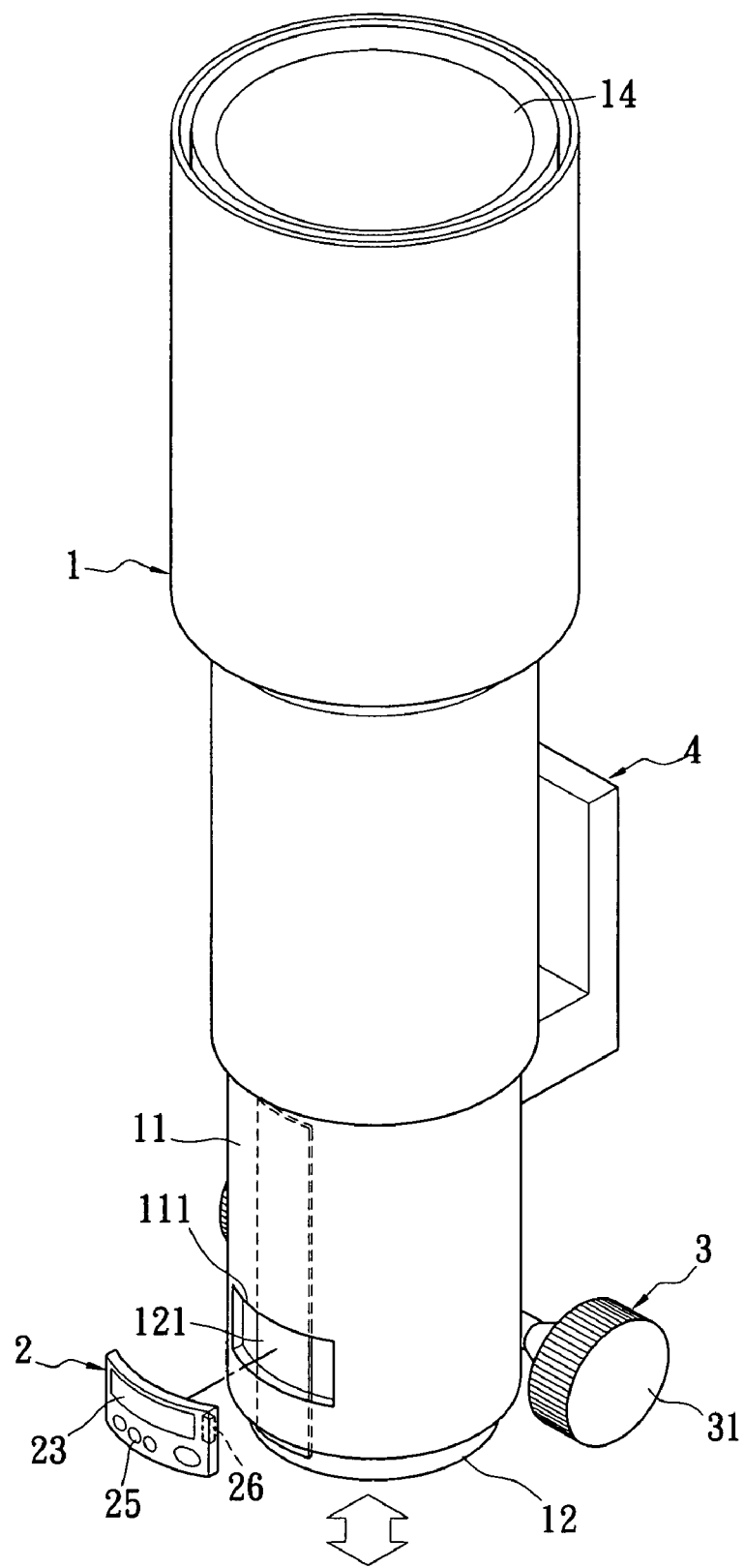
FIG. 1 is an exploded perspective view showing the telescopic having a focus display of the present invention.
Figure 2:
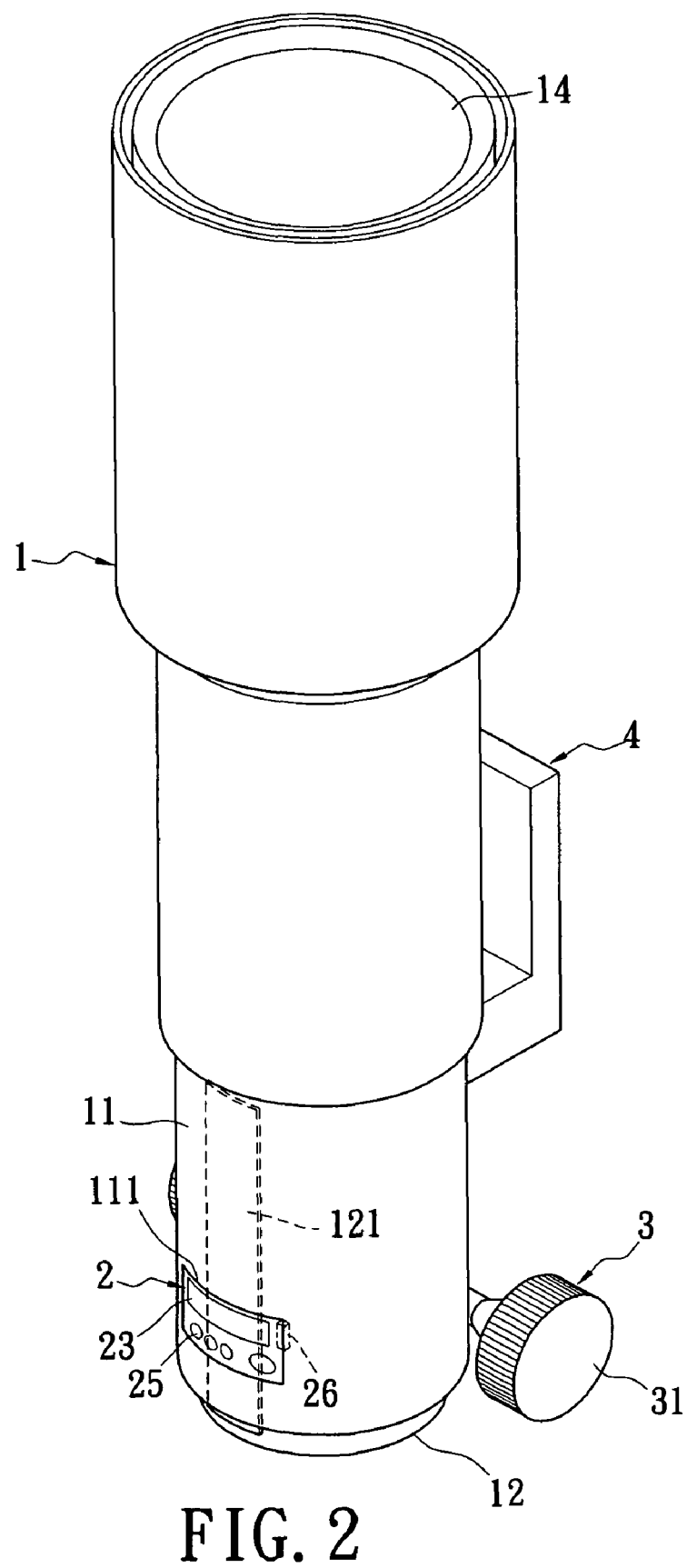
FIG. 2 is an assembled perspective view showing the telescopic having a focus display of the present invention.
Figure 3:
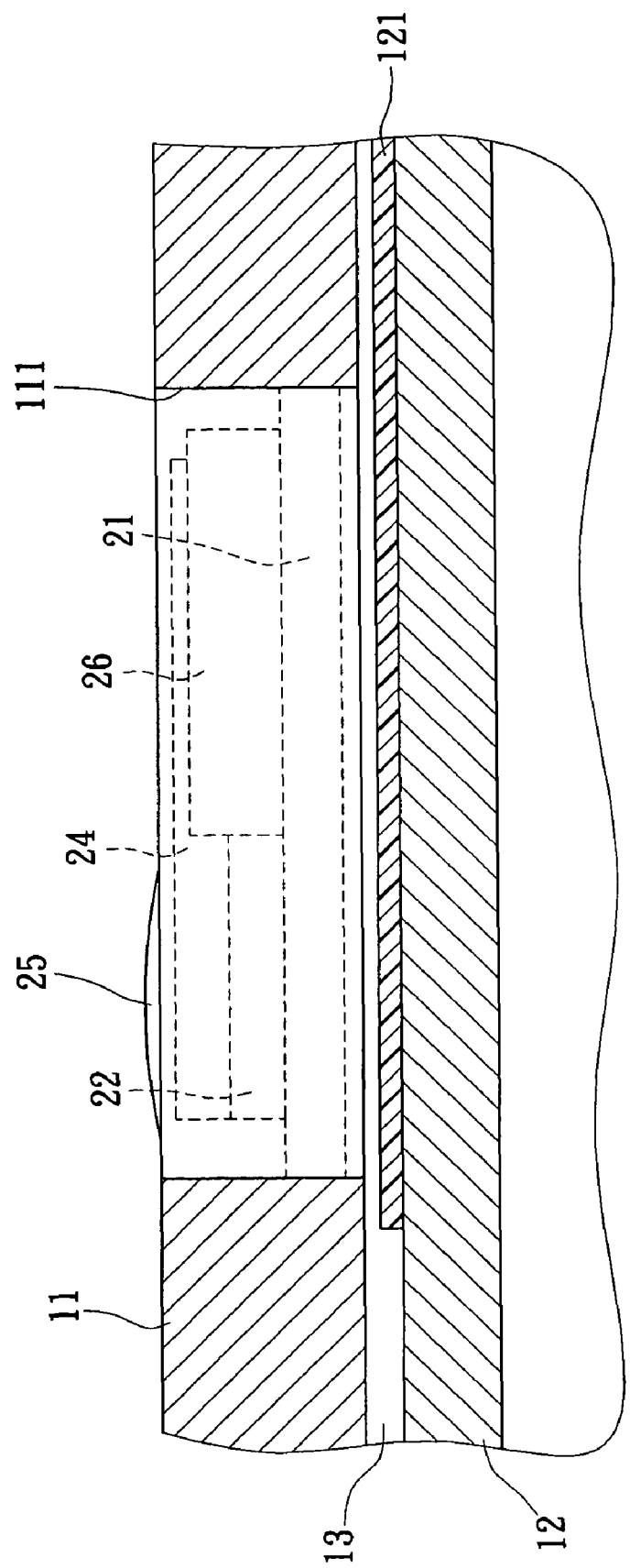
FIG. 3 is a side cross-sectional view showing the telescopic having a focus display of the present invention.
Figure 4:
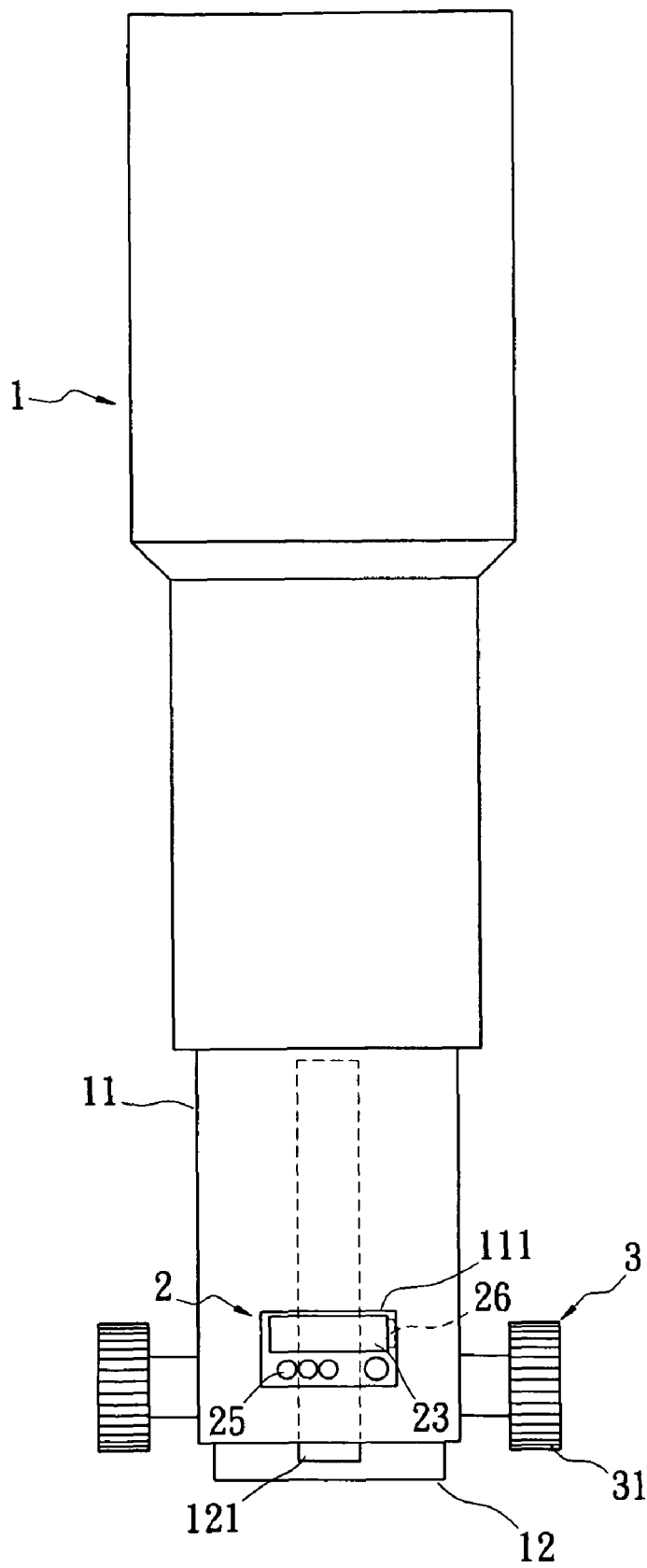
FIG. 4 is a top view showing the telescopic having a focus display of the present invention.

Please refer to FIGS. 1 to 4. The present invention provides a telescope having a focus display, which includes a tube assembly 1 and a focus display 2.

The tube assembly 1 comprises a first tube 11 and a second tube 12. The first tube 11 has an opening 111. The opening 111 is formed in such a way that it corresponds to the geometrical profile of the focus display 2. The second tube 12 is coaxially arranged in the first tube, so that the second tube 12 can be axially and telescopically moved in the first tube 11. A gap 13 is formed between the first tube 11 and the second tube 12. The opening 111 of the first tube 11 is in communication with the gap 13.

The tube assembly 1 is provided with a plurality of optical lenses 14. Via these optical lenses 14, a target can be properly magnified, thereby generating a clear image for the user's observation.

The sensor 121 is formed into an elongate piece, which is arranged axially on the second tube 12 to correspond to the opening 111 of the first tube 11. The sensor 121 is provided with sensing coils (not shown). The sensing coils of the sensor 121 can be sensed by an electromagnetic sensing unit 21, thereby facilitating the subsequent calculation for the displacement between the first tube 11 and the second tube 12.

The focus display 2 comprises an electromagnetic sensing unit 21, a processing unit 22, a screen 23, a control unit 24, a key module 25 and a light-emitting element 26.

The electromagnetic sensing unit 21, the processing unit 22, the screen 23, the control unit 24, the key module 25 and the light-emitting element 26 are electrically connected to each other, thereby transmitting signals and electricity to each other.

The electromagnetic sensing unit 21 is provided at a bottom end of the focus display 2 to be adjacent to the sensor 121 on the second tube 12. When the first tube 11 is telescopically moved with respect to the second tube 12, the electromagnetic sensing unit 21 generates a relative movement over the sensor 121, thereby sensing the change in the electromagnetic field between the electromagnetic sensing unit 21 and the sensing coils of the sensor 121.

The processing unit 22 calculates the relative movement between the first tube 11 and the second tube 12 according to the change in the electromagnetic field between the electromagnetic sensing unit 21 and the sensor 121.

The screen 23 is provided at an upper end of the focus display 2 and is exposed to the upper surface of the first tube 11. The screen 23 is connected to the processing unit 22 and the electromagnetic sensing unit 21, and is used to display the displacement data calculated by the processing unit 22. Via this arrangement, the user can recognize the optimal focus data by virtue of the displacement data.

The control unit 24 is provided in the focus display 2. The key module 25 is provided adjacent to the screen 23. The key module 25 is connected to the control unit 24. The user can operate the key module 25 in cooperation with the control unit 24, thereby opening or closing the focus display 2. Furthermore, the data displayed in the screen 23 can be zeroed or memorized in use.

The light-emitting element 26 is provided inside the screen 23 and is electrically connected to the key module 25. The light-emitting element 26 is a light-emitting diode and can be used to illuminate the data displayed on the screen 23 during the observation at night.

The adjusting element 3 is provided with respect to the focus display 2 on the tube assembly 1. The adjusting element 3 has a rotating wheel 31. The user turns the rotating wheel 31 to generate a telescopic movement between the first tube 11 and the second tube 12, thereby adjusting the distance between the optical lenses 14.

The base 4 is provided with respect to the focus display 2 on the tube assembly 1, and it is arranged to be adjacent to the adjusting element 3. The telescope can be mounted on a tripod via the base 4 and thus can be situated firmly on suitable places, thereby facilitating the adjustment of observation angle.

The present invention has advantageous effects and features as follow.

When the first tube 11 is telescopically moved with respect to the second tube 12, the electromagnetic sensing unit 21 of the focus display 2 and the sensor 121 can calculate the precise displacement and display the focus data on the screen. Thus, the user can recognize the clear focus data easily. Furthermore, the focus data displayed by the focus display has a higher precision, so that the user can focus the telescope to obtain the clearest image quickly.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A telescope having a focus display, comprising:
an optical tube assembly of the telescope having a first tube and a second tube connected in the first tube, the first tube having an opening;
a sensor provided on the second tube; and
a focus display provided in the opening of the first tube, the focus display being provided with an electromagnetic sensing unit, a processing unit and a screen, whereby the electromagnetic sensing unit, the processing unit and the screen are electrically connected to each other,
the electromagnetic sensing unit senses and receives the change in the electromagnetic field of the sensor when the first tube is telescopically moved with respect to the second tube, and the processing unit then calculates the displacement and displays the displacement on the screen.

2. The telescope having a focus display according to claim 1, wherein a gap is formed between the first tube and the second tube.

3. The telescope having a focus display according to claim 1, wherein the focus display is provided with a control unit and a key module, the control unit being electrically connected to the key module and the screen.

4. The telescope having a focus display according to claim 1, wherein the optical tube assembly is provided with optical lenses.

5. The telescope having a focus display according to claim 1, wherein the optical tube assembly is provided with an adjusting element, and the adjusting element is provided with a rotating wheel.

6. The telescope having a focus display according to claim 1, wherein the optical tube assembly is provided with a base.

7. The telescope having a focus display according to claim 1, wherein the sensor is provided with sensing coils.

8. The telescope having a focus display according to claim 1, wherein the focus display has a light-emitting element, and the light-emitting element is provided inside the screen.

9. The telescope having a focus display according to claim 1, wherein the light-emitting element is a light-emitting diode.

* * * * *